(12) United States Patent
Lan

(10) Patent No.: US 11,111,438 B2
(45) Date of Patent: Sep. 7, 2021

(54) DISPLAY PANEL AND DISPLAY DEVICE

(71) Applicant: TCL China Star Optoelectronics Technology Co., Ltd., Guangdong (CN)

(72) Inventor: Song Lan, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 46 days.

(21) Appl. No.: 16/615,714

(22) PCT Filed: Sep. 20, 2019

(86) PCT No.: PCT/CN2019/107108
§ 371 (c)(1),
(2) Date: Nov. 21, 2019

(87) PCT Pub. No.: WO2021/022636
PCT Pub. Date: Feb. 11, 2021

(65) Prior Publication Data
US 2021/0096430 A1 Apr. 1, 2021

(30) Foreign Application Priority Data
Aug. 7, 2019 (CN) .......................... 201910723905.4

(51) Int. Cl.
| | |
|---|---|
| *C09K 19/56* | (2006.01) |
| *G02F 1/1337* | (2006.01) |
| *G02F 1/1333* | (2006.01) |
| *G02F 1/1335* | (2006.01) |

(Continued)

(52) U.S. Cl.
CPC ............ *C09K 19/56* (2013.01); *G02F 1/1339* (2013.01); *G02F 1/1368* (2013.01);
(Continued)

(58) Field of Classification Search
CPC ................ C09K 19/56; C09K 2323/00; C09K 2323/02; G02F 1/133742; G02F 1/133377;
(Continued)

(56) References Cited

U.S. PATENT DOCUMENTS

| | | |
|---|---|---|
| 2011/0128488 A1 | 6/2011 | Kim |
| 2015/0185543 A1 | 7/2015 | Lee et al. |

(Continued)

FOREIGN PATENT DOCUMENTS

| | | |
|---|---|---|
| CN | 101852952 A | 10/2010 |
| CN | 101923251 A | 12/2010 |

(Continued)

*Primary Examiner* — Ruiyun Zhang

(57) ABSTRACT

The embodiment of the present invention discloses a display panel and a display device. The present invention, by designing a supportive blocking wall, divides a liquid crystal cell into regions, and fills vertical alignment agents with corresponding structures in the different regions of the liquid crystal cell to adjust alignment ability of liquid crystal molecules in gap regions among different liquid crystal layers such that the liquid crystal molecules in the different regions have the same alignment ability to mitigate phenomenon of poor alignment of the liquid crystal molecules and improve display effect of the display panel.

14 Claims, 2 Drawing Sheets

(51) Int. Cl.
*G02F 1/1339* (2006.01)
*G02F 1/1368* (2006.01)

(52) U.S. Cl.
CPC .. *G02F 1/133377* (2013.01); *G02F 1/133512* (2013.01); *G02F 1/133514* (2013.01); *G02F 1/133711* (2013.01); *G02F 1/133742* (2021.01); *C09K 2323/02* (2020.08)

(58) Field of Classification Search
CPC ......... G02F 1/133512; G02F 1/133514; G02F 1/133711; G02F 1/1339
USPC .......... 428/1.1, 1.2; 349/123, 129, 130, 124, 349/142, 156
See application file for complete search history.

(56) References Cited

U.S. PATENT DOCUMENTS

| | | |
|---|---|---|
| 2017/0059916 A1 | 3/2017 | Park et al. |
| 2017/0205668 A1 | 7/2017 | Kim et al. |
| 2018/0052367 A1 | 2/2018 | Ma et al. |
| 2019/0023988 A1 | 1/2019 | Zhong et al. |
| 2019/0285951 A1 | 9/2019 | Miyachi et al. |

FOREIGN PATENT DOCUMENTS

| | | |
|---|---|---|
| CN | 104597661 A | 5/2015 |
| CN | 104749831 A | 7/2015 |
| CN | 105487301 A | 4/2016 |
| CN | 106980214 A | 7/2017 |
| CN | 110023827 A | 7/2019 |
| KR | 100413474 B1 | 12/2003 |

DISPLAY PANEL AND DISPLAY DEVICE

FIELD OF INVENTION

The present invention relates to a field of display technologies, especially to a display panel and a display device.

BACKGROUND OF INVENTION

In recent years, with the continuous development of information technology, mobile phones, computers, and even ordinary household appliances have gradually developed toward smart, portable, and mobile, and the efficiency of information exchange between human and computer has become very critical. To be able to efficiently process the information processed by the machine, high efficiency, high quality, large capacity, light weight, low cost, low power consumption display plays an important role, resulting in that traditional cathode ray tube (CRT) displays in a few years are replaced by thin and light liquid crystal display (LCD) displays.

Layers of thin film material are respectively on a color filter substrate and a thin film transistor (TFT) array substrate of an LCD display, and a main function thereof is to arrange liquid crystal molecules along a specific orientation, which we call an alignment film (usually made of polyimide (PI) material). Main material of such alignment film is rubbing alignment type PI material and photo-alignment type PI material. However, each kind of material has its own defects. First, the rubbing alignment material easily incurs issues of dust particles, electrostatic residue, scratches and therefore lowers yield rate. Although photo-alignment material can avoid the above issues, due to limitations of material, heat durability and aging resistance thereof are poor, and capability of anchoring molecules is also poor such that quality of the display panel is influenced. Second, PI material itself has characteristics of high polarity and high water absorption, storage and carriage easily incurs metamorphism and results in uneven alignment. Also, the PI material is extremely expensive and has a complicated film forming process for TFT-LCD, which results in increased cost of the display panel.

Furthermore, the PI liquid solution also includes a large amount of N-METHYL-2-PYRROLIDONE (NMP) solvent, therefore a process of forming the alignment layer is highly energy consuming, and is extremely not environmentally friendly, and is highly hazardous to human bodies. Because of issues including uniformity, missing coating, low stickiness and foreign matter of the alignment layer, a yield rate of products is decreased and results in wasted sources and increased costs of the products. Therefore, a small amphiphilic molecule can achieve a goal of vertical alignment in the TFT-LCD without PI films. However, such small molecule has weak alignment ability and is easily affected by an electrical field. Under a circumstance of uneven gaps among liquid crystal layers, the issue of uneven alignment easily occurs.

SUMMARY OF INVENTION

The present invention provides a display panel and a display device, by designing a supportive blocking wall to divide the liquid crystal cell into regions, and filling vertical alignment agents with corresponding structures in the different regions of a liquid crystal cell, adjusts alignment abilities of liquid crystal molecules in gap regions among different liquid crystal layers such that liquid crystal molecules in the different region acquire the same alignment ability to mitigate phenomenon of poor alignment of the liquid crystal molecules and improve display effect of the display panel.

The present invention provides a display panel, the display panel comprises:

a first substrate;

a second substrate disposed opposite to the first substrate, the second substrate comprising a black matrix;

a liquid crystal cell, the liquid crystal cell comprising the first substrate, the second substrate and a liquid crystal composition; and a supportive blocking wall disposed between the first substrate and the second substrate, the supportive blocking wall disposed in a region of the black matrix, the supportive blocking wall dividing the liquid crystal cell into a first liquid crystal region and a second liquid crystal region, wherein the first liquid crystal region is filled with a first vertical alignment agent, and the second liquid crystal region is filled with a second vertical alignment agent.

Furthermore, the display panel comprises a pixel region, the pixel region comprises a red sub-pixel region, a green sub-pixel region, and a blue sub-pixel region, the first liquid crystal region is the blue sub-pixel region, and the second liquid crystal region comprises the red sub-pixel region and the green sub-pixel region.

Furthermore, the first vertical alignment agent comprises a rigid group, and the display panel comprises at least three rigid groups.

Furthermore, the second vertical alignment agent comprises a rigid group, and the display panel comprises one or two rigid groups.

Furthermore, a structural formula of the first vertical alignment agent is:

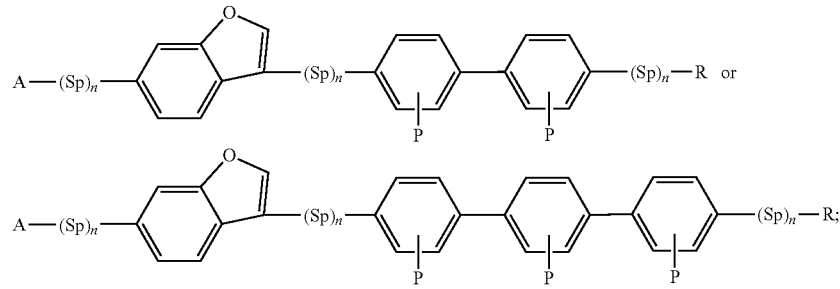

wherein the A is one of a primary amino group, a secondary amino group, a tertiary amino group, —OH, —COOH, —SOOCH₃, —CN, —Si(CH₃)₃, —Si(OCH₃)₃, and —SiCl$_2$; the Sp is a first substituent group, the n is a number of the first substituent group, the n is an integer from 1 to 8; the B is a benzene ring or cyclohexane; the P is a polymerizable group; and the R is alkane.

Furthermore, the Sp is one of —CH$^2$—, —O—, —S—, —CO—, —CO—O—, —O—CO—, —O—CO—O—, —OCH$^2$—, —CH$^2$O—, —CH═CH—, —CF═CF—, —C≡C—, —CH═CH—COO—, and —COO—CH═CH—.

Furthermore, the polymerizable group P is one of

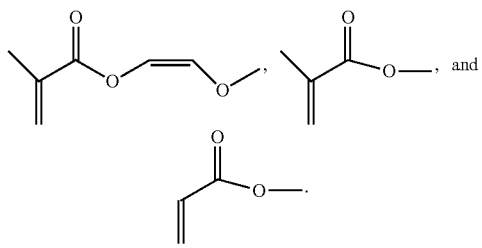

Furthermore, the R is alkane of a straight chain or a branched chain, and a number of carbon atoms in the alkane is an integer from 5 to 20.

Furthermore, the R comprises a substituent group, and the substituent group comprises fluorine atoms or chlorine atoms.

Furthermore, a structural formula of the second vertical alignment agent is:

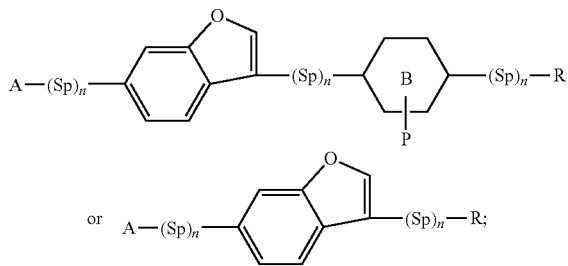

wherein the A is one of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_2$; the Sp is a first substituent group, the n is a number of the first substituent group, the n is an integer from 1 to 8; the B is a benzene ring or cyclohexane; the P is a polymerizable group; and the R is alkane.

Furthermore, the Sp is one of —CH$^2$—, —O—, —S—, —CO—, —CO—O—, —O—CO—, —O—CO—O—, —OCH$^2$—, —CH$^2$O—, —CH═CH—, —CF═CF—, —C≡C—, —CH═CH—COO—, and —COO—CH═CH—.

Furthermore, the polymerizable group P is

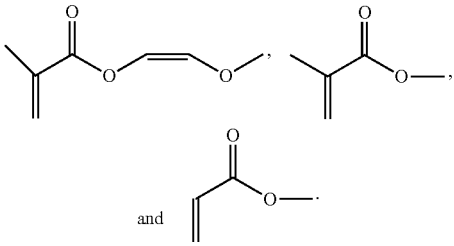

Furthermore, the R is alkane of a straight chain or a branched chain, and a number of carbon atoms in the alkane is an integer from 5 to 20.

Furthermore, the R comprises a substituent group, and the substituent group comprises fluorine atoms or chlorine atoms.

Furthermore, the first substrate is a thin film transistor array substrate, and the second substrate is a color filter substrate.

The present invention further comprises a display device, the display device comprises a display panel, the display panel comprises:

a first substrate;

a second substrate disposed opposite to the first substrate, the second substrate comprising a black matrix;

a liquid crystal cell, the liquid crystal cell comprising the first substrate, the second substrate and a liquid crystal composition; and a supportive blocking wall disposed between the first substrate and the second substrate, the supportive blocking wall disposed in a region of the black matrix, the supportive blocking wall dividing the liquid crystal cell into a first liquid crystal region and a second liquid crystal region, wherein the first liquid crystal region is filled with a first vertical alignment agent, and the second liquid crystal region is filled with a second vertical alignment agent.

Furthermore, the display panel comprises a pixel region, the pixel region comprises a red sub-pixel region, a green sub-pixel region, and a blue sub-pixel region, the first liquid crystal region is the blue sub-pixel region, and the second liquid crystal region comprises the red sub-pixel region and the green sub-pixel region.

Furthermore, a structural formula of the first vertical alignment agent is:

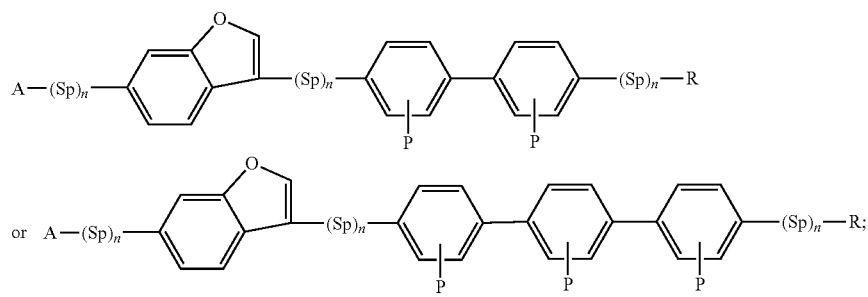

wherein the A is one of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_2$; the Sp is a first substituent group, the n is a number of the first substituent group, the n is an integer from 1 to 8; the B is a benzene ring or cyclohexane; the P is a polymerizable group; and the R is alkane.

Furthermore, a structural formula of the second vertical alignment agent is:

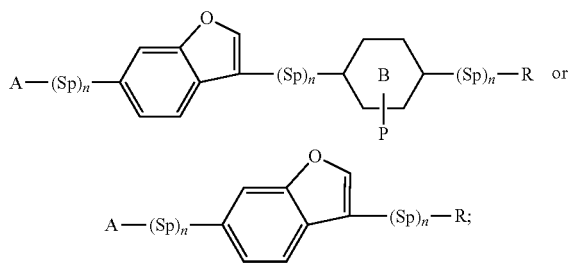

wherein the A is one of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_2$; the Sp is a first substituent group, the n is a number of the first substituent group, the n is an integer from 1 to 8; the B is a benzene ring or cyclohexane; the P is a polymerizable group; and the R is alkane.

Furthermore, the polymerizable group P in the display device is one of

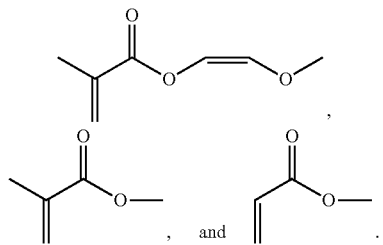

Advantages: The embodiment of the present invention provides a display panel, the display panel comprises: a first substrate; a second substrate disposed opposite to the first substrate, the second substrate comprising a black matrix; liquid crystal cell, the liquid crystal cell comprising the first substrate, the second substrate, and a liquid crystal composition; a supportive blocking wall disposed between the first substrate and the second substrate, the supportive blocking wall disposed in a region of the black matrix, the supportive blocking wall dividing the liquid crystal cell into a first liquid crystal region and a second liquid crystal region, wherein the first liquid crystal region is filled with a first vertical alignment agent, and the second liquid crystal region is filled with a second vertical alignment agent. The present invention, by designing a supportive blocking wall to divide the liquid crystal cell into regions, and filling vertical alignment agents with corresponding structures in the different regions of a liquid crystal cell, adjusts alignment abilities of liquid crystal molecules in gap regions among different liquid crystal layers such that liquid crystal molecules in the different region acquire the same alignment ability to mitigate phenomenon of poor alignment of the liquid crystal molecules and improve display effect of the display panel.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
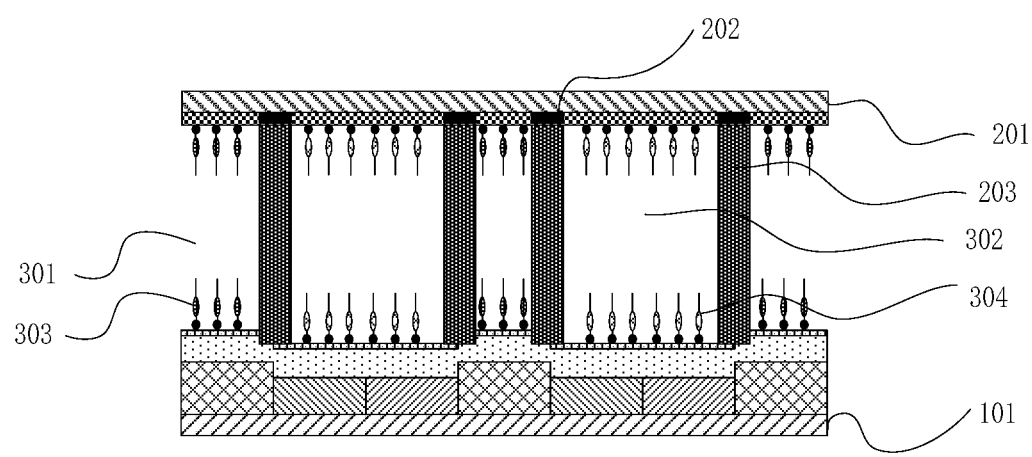
FIG. 1 is a schematic structural view of an embodiment of a display panel of provided by the present invention.

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

In the description of the present invention, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present invention and simplifying the description instead of indicating or implying that the referred device or element must have a specific orientation or position, must to be structured and operated with the specific orientation or position. Therefore, they should not be understood as limitations to the present invention. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present invention, a meaning of "a plurality of" is two or more, unless there is a clear and specific limitation otherwise.

In the present invention, the word "exemplary" is used to mean "serving as an example, illustration or description". Any embodiment described as "exemplary" in the present invention is not necessarily construed as preferred or more advantageous over other embodiments. In order to enable any person skilled in the art to implement and use the present invention, the following description is given. In the following description, details are set forth for the purpose of explanation. It should be understood that a person of ordinary skill in the art will appreciate that the present invention may be implemented without the use of these specific details. In other instances, the known structures and processes are not elaborated to avoid unnecessary details from making descriptions of the present invention becomes ambiguous. Therefore, the present invention is not intended to be limited to the illustrated embodiment, but is consistent with the broadest scope of the principles and features disclosed by the present invention.

A conventional polyimide (PI) liquid solution also includes a large amount of N-METHYL-2-PYRROLI- DONE (NMP) solvent, therefore a process of forming the alignment layer is highly energy consuming, and is extremely not environmentally friendly, and is highly hazardous to human bodies. Because of issues including uniformity, missing coating, low stickiness and foreign matter of the alignment layer, a yield rate of products is decreased and results in wasted sources and increased costs of the products. Therefore, a small amphiphilic molecule can achieve a goal of vertical alignment in the TFT-LCD without PI films. However, such small molecule has weak alignment ability and is easily affected by an electrical field. Under a circumstance of uneven gaps among liquid crystal layers, the issue of uneven alignment easily occurs.

The embodiment of the present invention provides a display panel and a display device that will be described as follows respectively.

First, the embodiment of the present invention provides a display panel, the display panel comprises: a first substrate; a second substrate disposed opposite to the first substrate, the second substrate comprising a black matrix; liquid crystal cell, the liquid crystal cell comprising the first substrate, the second substrate, and a liquid crystal composition; a supportive blocking wall disposed between the first substrate and the second substrate, the supportive blocking wall disposed in a region of the black matrix, the supportive blocking wall dividing the liquid crystal cell into a first liquid crystal region and a second liquid crystal region, wherein the first liquid crystal region is filled with a first vertical alignment agent, and the second liquid crystal region is filled with a second vertical alignment agent.

With reference to FIG. 1, FIG. 1 is a schematic structural view of an embodiment of a display panel of provided by the present invention. The display panel comprises: a first substrate 101, and the first substrate 101 being a thin film transistor array substrate; a second substrate 201 disposed opposite to the first substrate, and the second substrate being a color filter substrate, the color filter substrate comprising a black matrix 202; a liquid crystal cell, and the liquid crystal cell comprising the first substrate, the second substrate, and a liquid crystal composition; a supportive blocking wall 203 disposed between the first substrate and the second substrate, and the supportive blocking wall disposed in a region of the black matrix, the supportive blocking wall dividing the liquid crystal cell into a first liquid crystal region 301 and a second liquid crystal region 302, wherein the first liquid crystal region 301 is filled with a first vertical alignment agent 303, and the second liquid crystal region 302 is filled with a second vertical alignment agent 304.

Specifically, drops of liquid crystal material containing the first vertical alignment agent is added in the first liquid crystal region, drops of liquid crystal material containing the second vertical alignment agent is added in the second liquid crystal region. A mass ratio of the liquid crystal, the vertical alignment agent, and a reactive agent is 95-98%: 0.4-1.2%: 0.3%. Then the liquid crystal display panel is processed with ultraviolet irradiation under an illuminance of 365 nm 60-100 mW/cm$^2$, an irradiation time of 30-100 s. Then voltage is removed from the liquid crystal display panel, UV irradiation is implemented on the liquid crystal display panel with an irradiation time 90-120 mins.

A structure of the reactive agent can be:

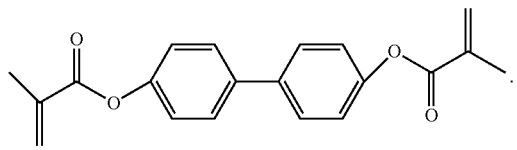 [SMILES: C=C(C)C(=O)Oc1ccc(-c2ccc(OC(=O)C(=C)C)cc2)cc1]

The embodiment of the present invention provides a display panel, and the display panel comprises: a first substrate; a second substrate disposed opposite to the first substrate, the second substrate comprising a black matrix; liquid crystal cell, the liquid crystal cell comprising the first substrate, the second substrate, and a liquid crystal composition; a supportive blocking wall disposed between the first substrate and the second substrate, the supportive blocking wall disposed in a region of the black matrix, the supportive blocking wall dividing the liquid crystal cell into a first liquid crystal region and a second liquid crystal region, wherein the first liquid crystal region is filled with a first vertical alignment agent, and the second liquid crystal region is filled with a second vertical alignment agent. The present invention, by designing a supportive blocking wall to divide the liquid crystal cell into regions, and filling vertical alignment agents with corresponding structures in the different regions of a liquid crystal cell, adjusts alignment abilities of liquid crystal molecules in gap regions among different liquid crystal layers such that liquid crystal molecules in the different region acquire the same alignment ability to mitigate phenomenon of poor alignment of the liquid crystal molecules and improve display effect of the display panel.

On the basis of the above embodiment, in another specific embodiment of the present invention, the display panel comprises a pixel region, the pixel region comprises a red sub-pixel region, a green sub-pixel region, and a blue sub-pixel region. The first liquid crystal region is the blue sub-pixel region, and the second liquid crystal region comprises the red sub-pixel region and the green sub-pixel region.

Figure 2:
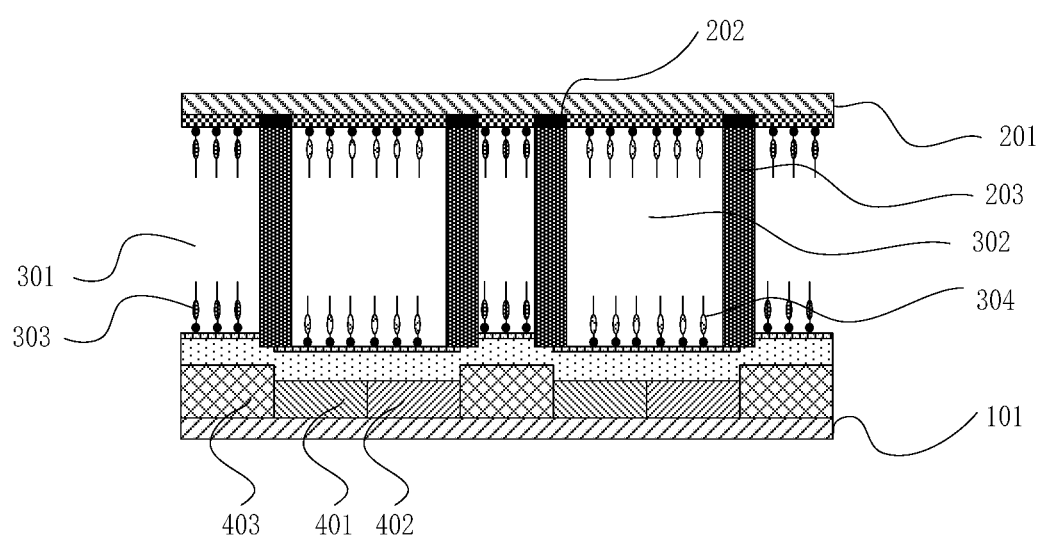
FIG. 2 is a schematic structural view of another embodiment of a display panel of provided by the present invention.

With reference to FIG. 2, FIG. 2 is a schematic structural view of another embodiment of a display panel of provided by the present invention. The display panel comprises a pixel region, and the pixel region comprises a red sub-pixel region 401, a green sub-pixel region 402, and a blue sub-pixel region 403. The first liquid crystal region 301 is the blue sub-pixel region 403, the second liquid crystal region 302 comprises the red sub-pixel region 401 and the green sub-pixel region 402.

On the basis of the above embodiment, in another specific embodiment of the present invention, the first vertical alignment agent includes a rigid group, and a number of the rigid group is at least three.

Specifically, the number of the rigid group comprised by the first vertical alignment agent (number of a benzene ring) is such that an aligning capability is stronger and requires a higher electrical field to achieve a specific tilt angle of the liquid crystal on a surface of the substrate. For example, the first vertical alignment agent includes five rigid groups. The present invention has no specific limitation to the number of the rigid group and depends on actual circumstances.

On the basis of the above embodiment, in another specific embodiment of the present invention, the second vertical alignment agent comprises a rigid group, and a number of the rigid group is one or two. For example, the second vertical alignment agent comprises one rigid group.

The number of the rigid group comprised by the second vertical alignment agent (number of a benzene ring) is 2, such that an aligning capability is a bit weak and requires a lower electrical field to achieve a specific tilt angle of the liquid crystal on a surface of the substrate.

On the basis of the above embodiment, in another specific embodiment of the present invention, a structural formula of the first vertical alignment agent is:

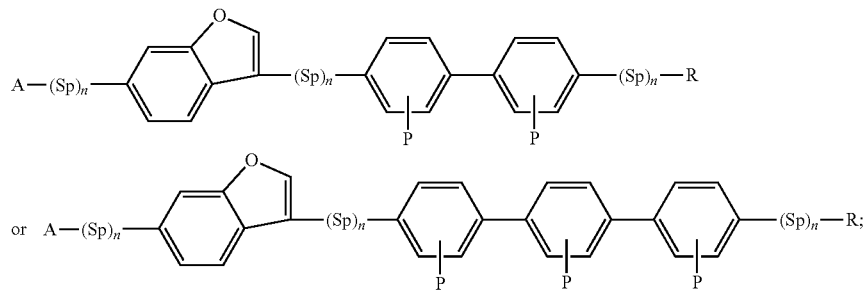

The A is one of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_2$. For example, the A is —SOOCH$^3$. The present invention has no limitation to the A, and depends on a specific actual circumstance A, and depends on a specific actual circumstance. The Sp is a first substituent group, the n is a number of the first substituent group, the n is an integer from 1 to 8. For example, the n is 3, the present invention has no limitation to a specific number of the n and depends on a specific actual circumstance. The B is a benzene ring or cyclohexane. For example, the B is a benzene ring. The P is a polymerizable group. The R is alkane.

Specifically, a specific structure of the first vertical alignment agent can be as follows:

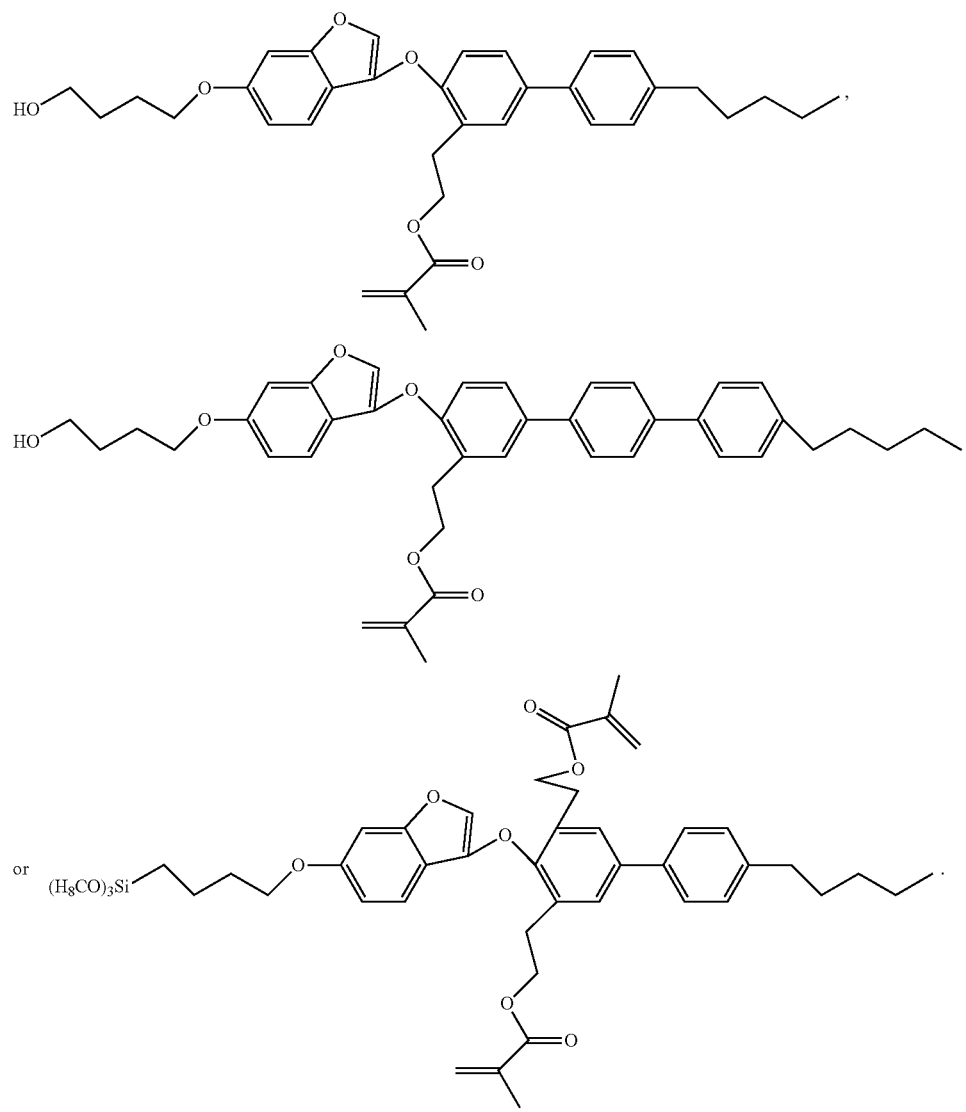

On the basis of the above embodiment, in another specific embodiment of the present invention, a structural formula of the second vertical alignment agent:

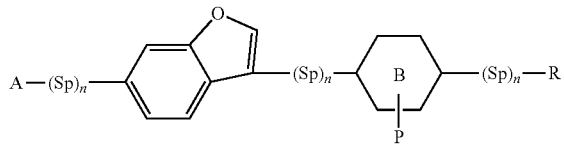

or 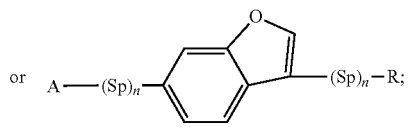

The A is one of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_2$. For example, the A is —SOOCH$^3$. The present invention has no limitation to the A, and depends on a specific actual circumstance A, and depends on a specific actual circumstance. The Sp is a first substituent group, the n is a number of the first substituent group, and the n is an integer from 1 to 8. For example the n is 3. The present invention has no limitation to the Sp, and depends on a specific actual circumstance specific number of the n, and depends on a specific actual circumstance. The B is a benzene ring or cyclohexane. For example, the B is a benzene ring. The P is a polymerizable group. The R is alkane.

Specifically, a specific structure of t the second vertical alignment agent can be as follows:

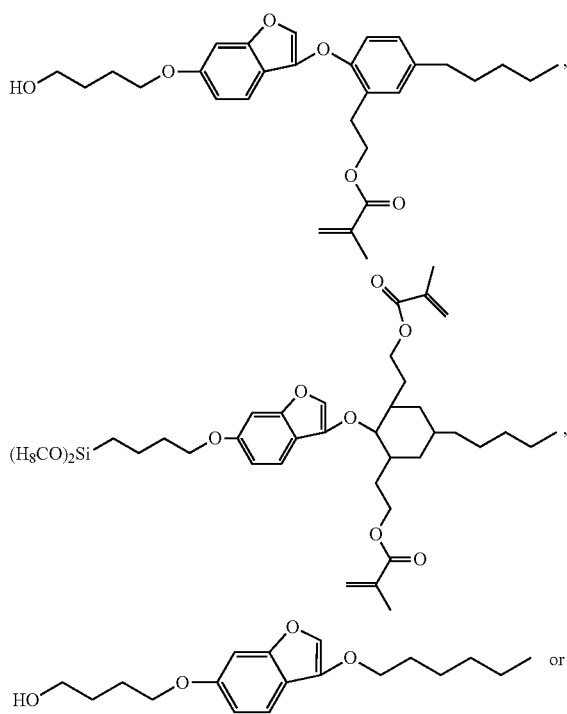

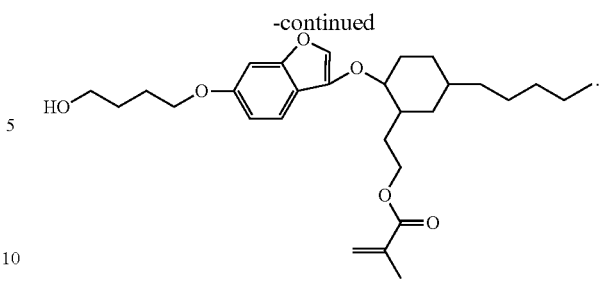

On the basis of the above embodiment, in another specific embodiment of the present invention, the Sp is one of —CH$^2$—, —O—, —S—, —CO—, —CO—O—, —O—CO—, —O—CO—O—, —OCH$^2$—, —CH$^2$O—, —CH═CH—, —CF═CF—, —C≡C—, —CH═CH—COO— or —COO—CH═CH—. For example, the Sp is —C≡C—. The present invention has no limitation to the Sp, and depends on a specific actual circumstance.

On the basis of the above embodiment, in another specific embodiment of the present invention, the polymerizable group P is one of

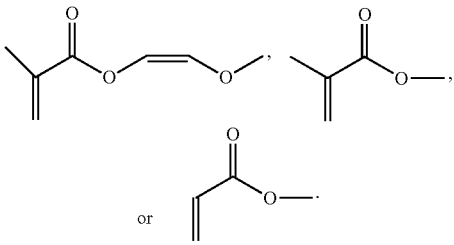

For example, the polymerizable group P is

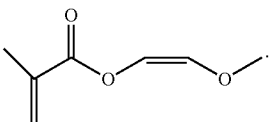

The present invention has no limitation to the polymerizable group P, and depends on a specific actual circumstance.

On the basis of the above embodiment, in another specific embodiment of the present invention, the R is alkane of a straight chain or a branched chain, and a number of carbon atoms in the alkane is an integer from 5 to 20. For example, carbon atoms in the alkane is 8. The present invention has no limitation to carbon atoms in the alkane, and depends on a specific actual circumstance.

On the basis of the above embodiment, in another specific embodiment of the present invention, the R comprises a substituent group, and the substituent group is fluorine atoms or chlorine atoms. For example, the substituent group in the R is chlorine atoms. The present invention has no limitation to the substituent group in the R, and depends on a specific actual circumstance.

On the basis of the above embodiment, in another specific embodiment of the present invention, one of CH$^2$ group of the alkane can be replaced with —CONH—, —COO—, —O—CO—, —S—, —CO— or —CH═CH— group. For example, one CH$^2$ group of the alkane is replaced with —S—.

On the basis of the above embodiment, in another specific embodiment of the present invention, the first substrate is a thin film transistor array substrate. The second substrate is a color filter substrate.

The thin film transistor (TFT) is one kind of field effective transistors, an a method for manufacturing the TFT comprises depositing various thin films on a substrate, for example, a semiconductor active layer, a dielectric layer, and a metal electrode layer. The thin film transistor has very important effect to working performance of the display device.

On the basis of the above embodiment, in another specific embodiment of the present invention, the thin film transistor array substrate comprises a base substrate, thin film transistor layer, a color resist layer, a passivation layer, and an ITO conductive layer that are stacked on one another sequentially.

Specifically, the color resist layer comprises red color resists, blue color resists, and green color resists, colors of the color resist layer constitute the pixel region.

On the basis of the above embodiment, in another specific embodiment of the present invention, the color filter substrate comprises a base substrate, a black matrix layer, and an ITO conductive layer that are stacked on one another sequentially.

It should be explained that in the above display panel embodiment only the above structures are described. It should be understood that, besides the above structures, in the embodiment of the present invention display panel, any other necessary structures can be included as needed, for example a buffer layer, an interlayer dielectric (ILD) layer, and no limitation is thereto.

To better embody the display panel in the embodiment of the present invention, on the basis of the display panel, the embodiment of the present invention also provides a display device, and the display device includes the display panel of the above embodiment.

By employing the display panel as described in the above embodiments, performance of the display device is further enhanced.

In the above embodiments, each of the embodiment are focused on. Parts of some embodiment not described in details can refer to the detailed description in the above context for other embodiments and will not be described repeatedly.

In the specific implementation, each of the above units or structures may be implemented as a separate entity, or may be any combination, and implemented as the same entity or a plurality of entities. The specific implementation of the above units or structures refer to the previous method embodiment and will not be described repeatedly.

Specific implementation of the above operation can refer to the above embodiments and will not be described repeatedly herein.

A display panel and a display device provided by the embodiment of the present invention have been described in details as above. In the specification, the specific examples are used to explain the principle and embodiment of the present invention. The above description of the embodiments is only used to help understand the method of the present invention and its spiritual idea. Meanwhile, for those skilled in the art, according to the present the idea of invention, changes will be made in specific embodiment and application. In summary, the contents of this specification should not be construed as limiting the present invention.

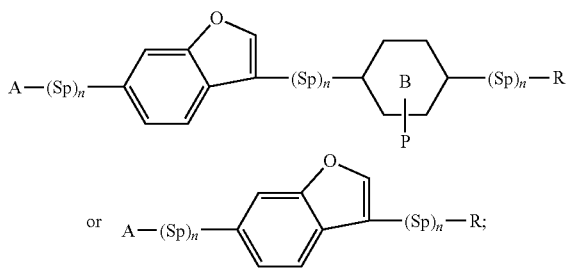

wherein the A is selected from the group consisting of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_3$; the Sp is —O, the n is 1; the B is a benzene ring or cyclohexane; the P is a polymerizable group and the R is alkyl.
14. The display device as claimed in claim 11, wherein the polymerizable group P is selected from the group consisting of
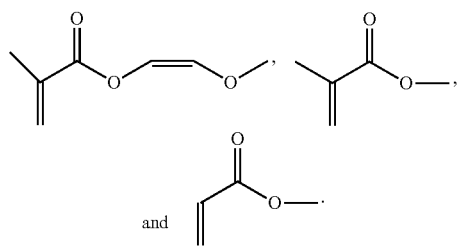

What is claimed is:
1. A display panel, comprising:
a first substrate;
a second substrate disposed opposite to the first substrate, the second substrate comprising a black matrix;
a liquid crystal cell, the liquid crystal cell comprising the first substrate, the second substrate, and a liquid crystal composition; and
a supportive blocking wall disposed between the first substrate and the second substrate, the supportive blocking wall disposed in a region of the black matrix, the supportive blocking wall dividing the liquid crystal cell into a first liquid crystal region and a second liquid crystal region, wherein the first liquid crystal region is filled with the liquid crystal composition containing a first vertical alignment agent, and the second liquid crystal region is filled with the liquid crystal composition containing a second vertical alignment agent,
wherein a structural formula of the first vertical alignment agent is:

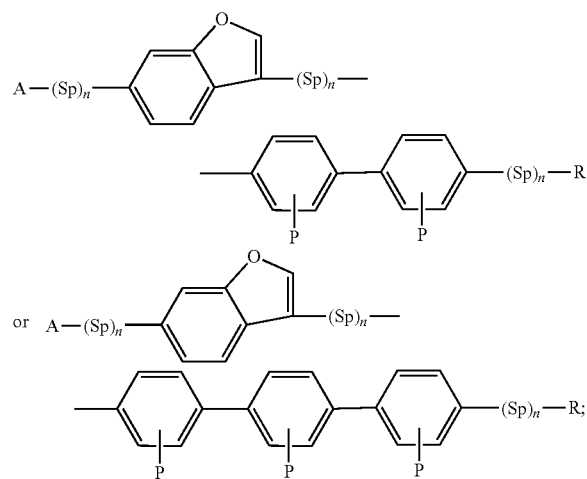

wherein the A is selected from the group consisting of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_3$; the Sp is —O—, the n is 1; the P is a polymerizable group; and the R is alkyl.

2. The display panel as claimed in claim 1, wherein the display panel comprises a pixel region, the pixel region comprises a red sub-pixel region, a green sub-pixel region, and a blue sub-pixel region, the first liquid crystal region is the blue sub-pixel region, and the second liquid crystal region comprises the red sub-pixel region and the green sub-pixel region.

3. The display panel as claimed in claim 1, wherein the polymerizable group P is selected from the group consisting of

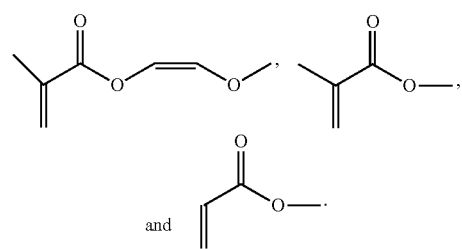

4. The display panel as claimed in claim 1, wherein the R is alkyl of a straight chain or a branched chain, and a number of carbon atoms in the alkyl is an integer from 5 to 20.

5. The display panel as claimed in claim 4, wherein the R comprises a substituent group, and the substituent group comprises fluorine atoms or chlorine atoms.

6. The display panel as claimed in claim 1, wherein a structural formula of the second vertical alignment agent is:

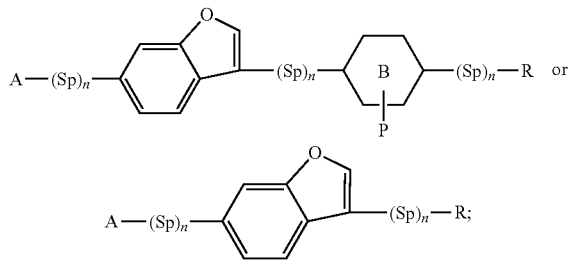

wherein the A is selected from the group consisting of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_3$; the Sp is —O, the n is 1; the B is a benzene ring or cyclohexane; the P is a polymerizable group and the R is alkyl.

7. The display panel as claimed in claim 6, wherein the polymerizable group P is selected from the group consisting of

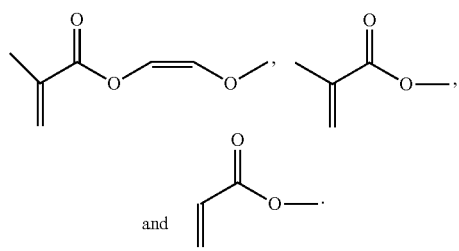

8. The display panel as claimed in claim 6, wherein the R is alkyl of a straight chain or a branched chain, and a number of carbon atoms in the alkyl is an integer from 5 to 20.

9. The display panel as claimed in claim 8, wherein the R comprises a substituent group, and the substituent group comprises fluorine atoms or chlorine atoms.

10. The display panel as claimed in claim 1, wherein the first substrate is a thin film transistor array substrate, and the second substrate is a color filter substrate.

11. A display device, comprising a display panel, and the display panel comprising:

a first substrate;

a second substrate disposed opposite to the first substrate, the second substrate comprising a black matrix;

a liquid crystal cell, the liquid crystal cell comprising the first substrate, the second substrate, and a liquid crystal composition; and a supportive blocking wall disposed between the first substrate and the second substrate, the supportive blocking wall disposed in a region of the black matrix, the supportive blocking wall dividing the liquid crystal cell into a first liquid crystal region and a second liquid crystal region, wherein the first liquid crystal region is filled with the liquid crystal composition containing a first vertical alignment agent, and the second liquid crystal region is filled with the liquid crystal composition containing a second vertical alignment agent, wherein a structural formula of the first vertical alignment agent is:

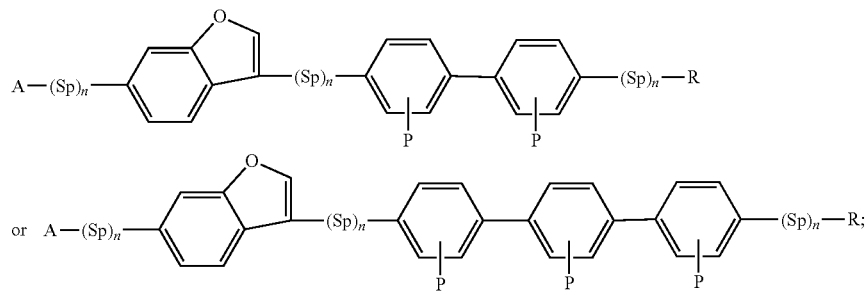

wherein the A is selected from the group consisting of a primary amino group, a secondary amino group, a tertiary amino group, —OH, —COOH, —SOOCH$_3$, —CN, —Si(CH$_3$)$_3$, —Si(OCH$_3$)$_3$, and —SiCl$_3$; the Sp is —O—, the n is 1; the P is a polymerizable group; and the R is alkyl.

12. The display device as claimed in claim 11, wherein the display panel comprises a pixel region, the pixel region comprises a red sub-pixel region, a green sub-pixel region, and a blue sub-pixel region, the first liquid crystal region is the blue sub-pixel region, and the second liquid crystal region comprises the red sub-pixel region and the green sub-pixel region.

13. The display device as claimed in claim 11, wherein a structural formula of the second vertical alignment agent is: